United States Patent

Iwata

Patent Number: 5,289,681
Date of Patent: Mar. 1, 1994

[54] POWER STEERING SYSTEM
[75] Inventor: Hiroto Iwata, Saitama, Japan
[73] Assignee: Jidosha Kiki Co., Ltd., Tokyo, Japan
[21] Appl. No.: 815,408
[22] Filed: Dec. 31, 1991
[30] Foreign Application Priority Data Jan. 16, 1991 [JP] Japan .................. 3-15877

[51] Int. Cl.⁵ ............................................. F16D 31/02
[52] U.S. Cl. ................................... 60/428; 60/468; 137/114; 137/115; 417/427; 418/269
[58] Field of Search .............. 60/428, 430, 468, 486, 60/422; 418/3, 212, 269; 417/199.1, 205, 427; 137/114, 115, 118

[56] References Cited

U.S. PATENT DOCUMENTS

| | | | |
|---|---|---|---|
| 3,280,557 | 10/1966 | Sattavara | 60/428 X |
| 3,828,569 | 8/1974 | Weisberger | 418/268 X |
| 3,975,909 | 8/1976 | McBurnett | 60/430 X |
| 4,164,119 | 8/1979 | Parquet | 60/428 |
| 4,694,927 | 9/1987 | Nagae | 60/468 X |
| 5,154,593 | 10/1992 | Konishi et al. | 418/268 X |

Primary Examiner—Edward K. Look
Assistant Examiner—Hoang Nguyen
Attorney, Agent, or Firm—Flynn, Thiel, Boutell & Tanis

[57] ABSTRACT

An oil pump which delivers an operating oil to a power steering mechanism of vehicle is designed to reduce the power which is wasted during a high speed operation. A subpump of a reduced capacity having a number of revolutions which varies with a vehicle speed is provided, in addition to a vane pump which delivers an operating oil to the power steering mechanism. A discharged oil from the subpump is delivered to act upon the rear surface of the vanes to enable a pumping action of the vane pump when operating at low speeds while the delivery of the discharged oil to the rear surface of the vanes is interrupted to cease the pumping action of the vane pump, and is delivered to the power steering mechanism when operating at higher speeds.

10 Claims, 5 Drawing Sheets

POWER STEERING SYSTEM

BACKGROUND OF THE INVENTION

The invention relates to a power steering system provided with a vane pump.

Generally, a power steering system is arranged such that oil discharged from a vane pump is supplied to or displaced from a power cylinder through a power steering servo valve, thereby imparting an assistance to a steering operation. The vane pump comprises a cam ring having a substantially elliptical cam surface, a rotor which is adapted to rotate inside the cam ring and a plurality of vanes adapted to move back and forth within radial slits formed in the rotor. A pumping function is provided by increasing and decreasing the volume of a pump chamber which is defined between a pair of adjacent vanes as the rotor rotates. During the rotation of the rotor, discharged oil is introduced to act upon the rear surface of the vanes so as to maintain the individual vanes positively in sliding contact with the cam surface of the cam ring.

In a conventional power steering system as described above, the discharge per revolution of the vane pump remains constant, and accordingly it is required to discharge a flow rate during a high speed operation, all of which results in an increased loss of driving horsepower. The introduction of the discharged pressure oil to act upon the rear surface of the vane causes the force, which urges the vane against the cam surface in a suction region to be increased, resulting in an abrasion caused by the relative sliding movement between the cam surface and the tip of the vanes. This made it impossible to chamfer the cam surface or to provide a suction opening in order to achieve a higher suction efficiency. The increased force with which the vane is urged against the cam surface increases the resistance presented to the sliding movement, thus causing a disadvantage that the driving horsepower is wasted.

SUMMARY OF THE INVENTION

Therefore, it is an object of the invention to provide a power steering system which is capable of reducing the power which is unnecessarily wasted during the high speed operation.

The above object is accomplished by a power steering system including a vane pump which supplies an operating oil for powering the power steering, a subpump which is driven for rotation by the same drive shaft as that used to drive the vane pump, and a control valve which is switched whenever the number of revolutions of the subpump reaches a preset value wherein when the number of revolutions is below the preset value, oil which is discharged from either the vane pump or the subpump is fed to the rear surface of the vanes of the vane pump while during the high speed operation, the supply of discharged oil to the back surface of the vanes is interrupted while simultaneously feeding the discharged oil from the subpump for facilitating the power steering.

DETAILED DESCRIPTION OF EMBODIMENTS

Figure 1:
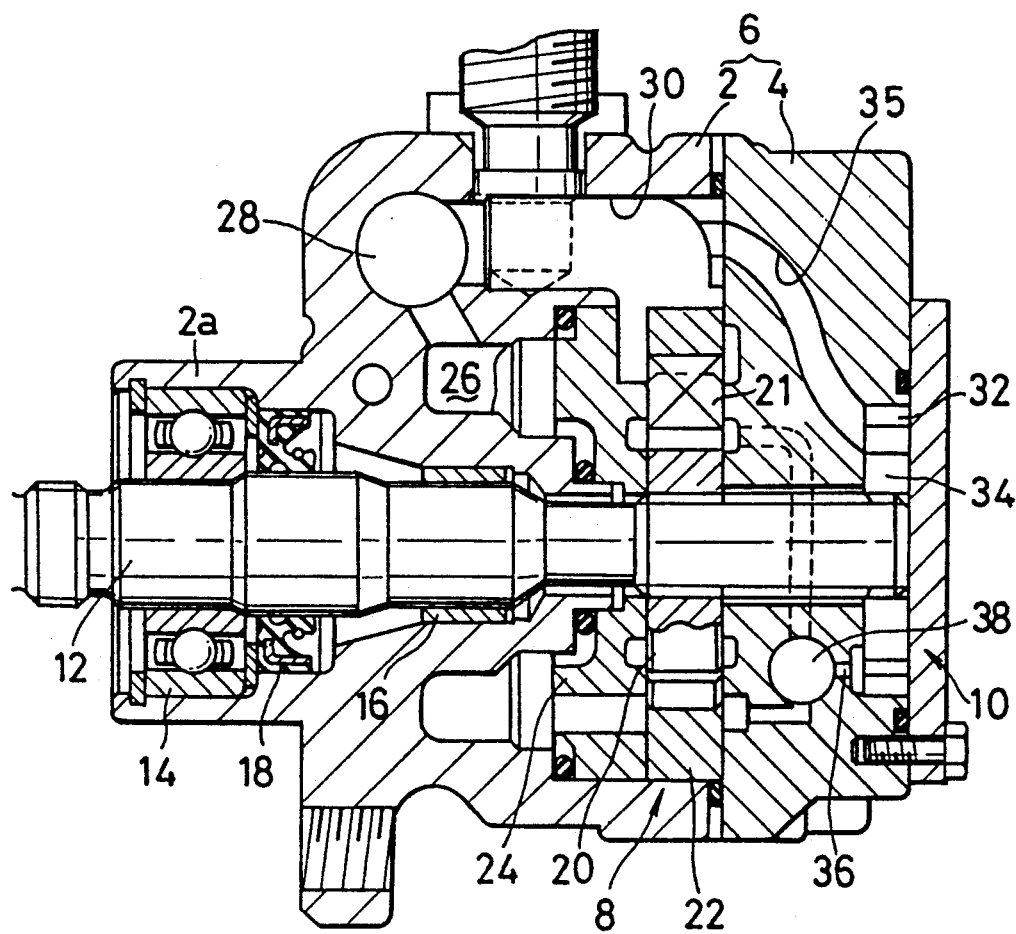
FIG. 1 is a longitudinal section of an oil pump used in a power steering system according to one embodiment of the invention.

Referring to the drawings, several embodiments of the invention will now be described. A substantially cylindrical front body 2 is disposed in abutment against a disc-shaped rear body 4 to define a pump body 6. A cartridge 8 of a vane pump (main pump) is received within the internal space defined within the front body 2 while a trochoidal pump (subpump) 10 is received within the internal space of the rear body 4.

The front body 2 has a cylindrical portion 2a of a reduced diameter, through which a drive shaft 12 is inserted to extend into the pump body 6 and is rotatably journalled therein by a pair of bearings 14 and 16. An oil seal 18 maintains the liquid tightness of the pump. At its intermediate portion located within the pump body 6, the drive shaft 12 has a rotor 20 splined thereto for rotation therewith. The rotor 20 is formed with a plurality of radially extending slits which are spaced apart at an equal interval around the circumference. A vane 21 is received in each slit for movement therein back and forth. A cam ring 22 having a substantially elliptical cam surface is disposed in surrounding relationship with the rotor 20. The rotor 20 and the cam ring 22 are held together by a combination of a pressure plate 24, disposed in the front body 2, and the rear body 4 to be held sandwiched therebetween, thereby defining a pump cartridge 8.

As the rotor 20 rotates inside the cam ring 22, the respective vanes 21 move back and forth in their associated slits in sliding contact with the cam surface of the cam ring 22, whereby each pump chamber defined between a pair of adjacent vanes 21 increases and decreases in volume to provide a pumping action. Oil which is discharged from the pump cartridge 8 into a plenum chamber 26 is delivered to a power steering mechanism, not shown, through a flow control valve 28 while an excess amount of flow is merged with oil from a suction port to be fed to the suction side of the pump cartridge 8 through a suction passage 30.

The trochoidal pump 10 which is disposed within the rear body 4 comprises an internally toothed stator 32, and an externally toothed rotor 34 having a number of teeth which is by one tooth less than the number of the teeth of the stator 32 and which is disposed for eccentric rotation within the stator 32. The trochoidal pump draws oil from a suction passage 35 formed in the rear body 4 in communication with the suction passage 30 formed in the front body 2, and discharges it through a passage 36. The discharged oil from the trochoidal pump 10 is delivered to the control valve 38.

Figure 2:
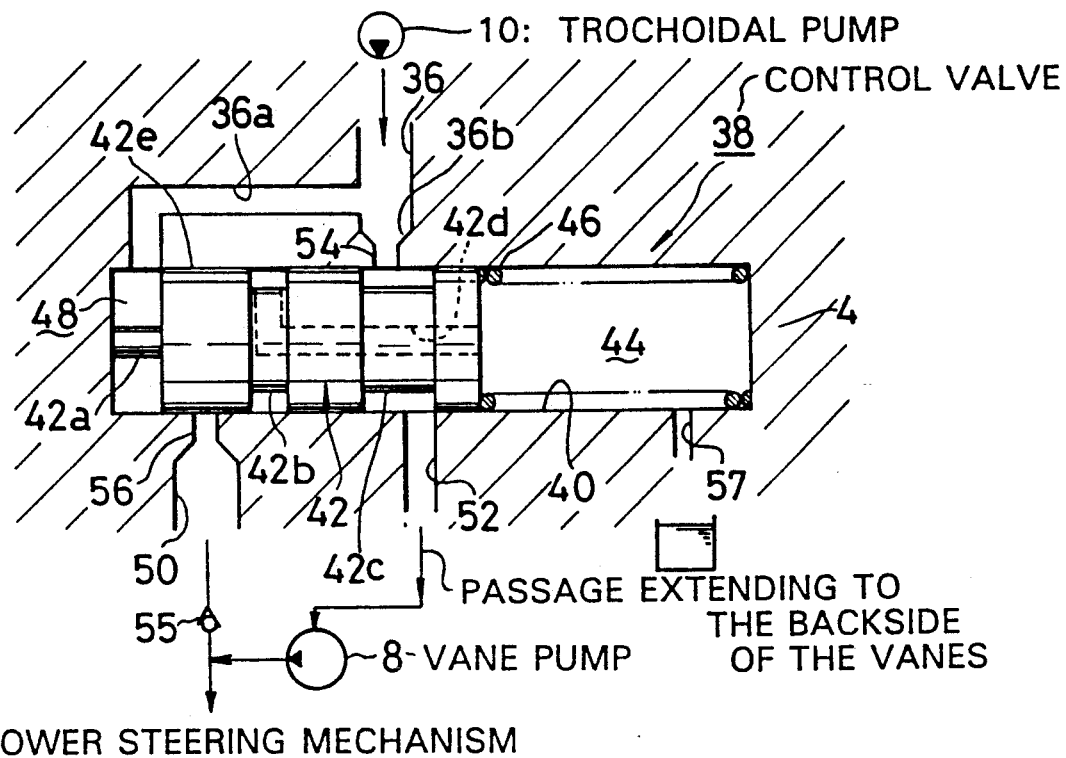
FIG. 2 is a longitudinal section of a control valve.

Referring to FIG. 2, the control valve 38 will be described. A spool 42 is slidably fitted in a valve opening 40 formed in the rear body 4. The spool 42 is urged by a spring 46, disposed in a liquid chamber 44 on one side of the spool 42, toward the other liquid chamber 48, which is located on the other side of the spool, until a stop 42a of the spool 42 bears against the end face of the valve opening 40 located on this other side. The spool 42 is peripherally formed with a pair of annular grooves 42b and 42c, and a passage 42d is formed within the spool to extend from the annular groove 42b, located toward the stop 42a, to the liquid chamber 44 in which the spring 46 is disposed.

The discharge passage 36 from the trochoidal pump 10 branches into a pair of branch paths 36a and 36b, which open into the valve opening 40. The path 36a introduces the discharged oil into the liquid chamber 48 located toward the stop 42a while the other path 36b introduces the discharged oil into the annular groove 42c located toward the spring 46 when the spool 42 is in its inoperative position. The valve opening 40 is also formed with a pair of passages 50 and 52 which communicate with a power steering mechanism, not shown, and to the back side of the vanes 21 of the vane pump 8, respectively. The passage 50 extending to a power steering mechanism is blocked by a land 42e on the spool 42 which is located toward the stop 42a when the spool assumes its inoperative position, but is allowed to communicate with the liquid chamber 48 as the spool 42 moves. The passage 52 extending to the back side of the vanes opens into the annular groove 42c, into which the branch path 36b of the discharge passage 36 from the trochoidal pump 10 opens. Orifices 54 and 56 are defined in the openings of the discharge path 36b into the annular groove 42c and of the passage 50 leading to a power steering mechanism into the valve opening 40. A check valve 55 is disposed in the passage 50 in order to prevent a back flow from the trochoidal pump 10 when the vane pump 8 is inoperative. The liquid chamber 44 in which the spring 46 is disposed communicates with a low pressure reservoir such as a tank through a drain passage 57.

Figure 3:
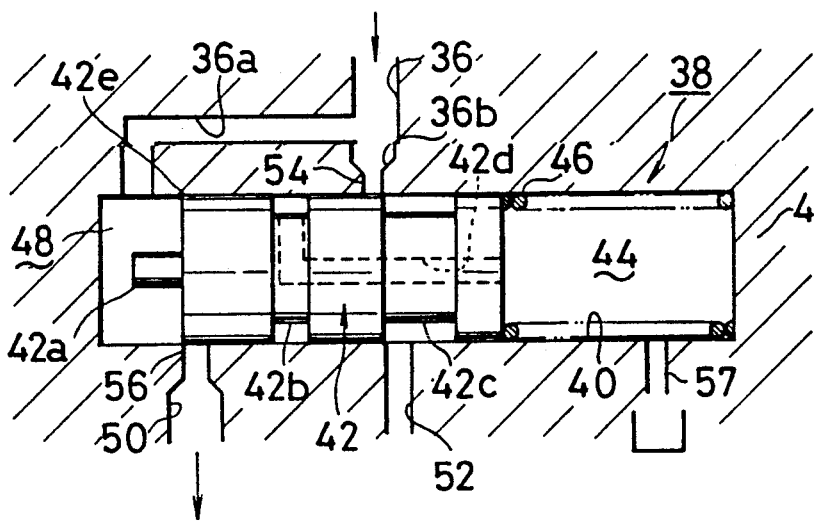
FIG. 3 is a schematic illustration of operation of the control valve.

The passage 50 leading to a power steering mechanism, and the branch path 36b and the passage 52 which open into the annular groove 42c formed in the spool 42 operate in a manner illustrated in FIG. 3 as the spool 42 moves. Specifically, after the orifice 56 in the passage 50 begins to open as shown, the orifice 54 in the branch path 36b from the trochoidal pump 10 is closed while the passage 52 extending to the back side of the vanes remains open at this time. As the spool 42 moves further, the passage 52 extending to the back side of the vanes 21 becomes closed while the orifice 54 in the branch path 36b begins to open, as illustrated in FIG. 4.

In the power steering system as described above, the amount of discharge from the trochoidal pump 10, which serves as a subpump, is chosen to be greater than the amount of oil which is required to act upon the rear surface of the vanes 21 of the vane pump 8. During an idling condition or when a vehicle is running at low speeds, the trochoidal pump 10 has a reduced discharge therefrom which is insufficient to move the spool 42 (see FIG. 2), whereby the discharged oil is fed through the branch path 36b, the orifice 54, the annular groove 42c in the spool 42 and the passage 52 to act upon the rear surface of the vanes 21 to allow the vane pump to perform a normal pumping action to deliver its discharge oil to a power steering mechanism.

However, when the number of revolutions continues to rise, the pressure in the liquid chamber 48 into which the discharge oil from the trochoidal pump 10 is introduced rises to drive the spool 42 to the right. The purpose of the orifices 54 and 56 is to boost the pressures upstream of the respective orifices, thereby creating a difference between the oil pressures which act upon the opposite ends of the spool 42. The higher the number of revolutions, the greater the magnitude of the pressure drops created by the orifices. Accordingly, the spool 42 continues to be driven to the right. When the spool 42 moves to a position illustrated in FIG. 3, the liquid chamber 48 located toward the stop 42a communicates with the power steering passage 50, whereby the discharged oil from the trochoidal pump 10 is supplied to a power steering mechanism while the orifice 54 which opens into the annular groove 42c formed in the spool 42 becomes closed to interrupt the delivery of the pressure oil to the back side of the vanes 21, thus ceasing the function of the vane pump 8.

Figure 4:
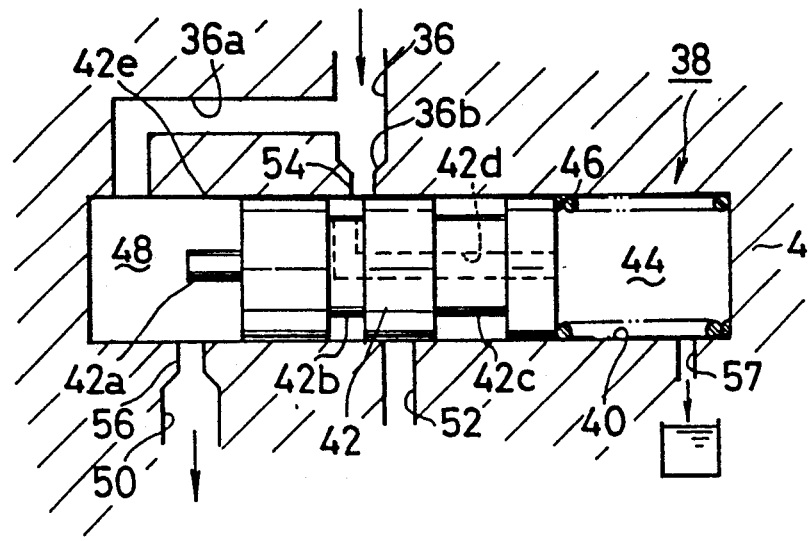
FIG. 4 is a similar view illustrating another phase of operation of the control valve.

As the number of revolutions further increases to increase the flow rate from the trochoidal pump 10, the provision of the orifice 56 in the opening of the passage 50 leading to a power steering mechanism causes a pressure rise in the liquid chamber 48, thus further driving the spool 42 to the right (see FIG. 4). Under this condition, the orifice 54 in the branch path 36b from the trochoidal pump 10 opens into the annular groove 42b which communicates with the internal passage 42d, so that part of the discharged oil is returned as an excess flow, preventing a flow in excess of the amount required from being delivered to a power steering mechanism.

The provision of the subpump (trochoidal pump) 10 in addition to the main vane pump 8 to allow the subpump to function in the same way as the vane pump 8 by introducing the discharged oil from the trochoidal pump 10 to the back side of the vanes while interrupting the functioning of the vane pump during the high speed operation allows the wasted power to be reduced during the high speed operation. Since the trochoidal pump 10 has a good starting response, the operating response of the vane pump 8 at low temperatures can be improved. In addition, since the discharged oil which is introduced to the back side of the vanes 21 from the trochoidal pump 10 is at a low pressure, the force with which the vanes 21 are urged against the cam ring 22 is reduced, thus improving the durability of both the cam ring 22 and the vanes 21.

Figures 5, 6:
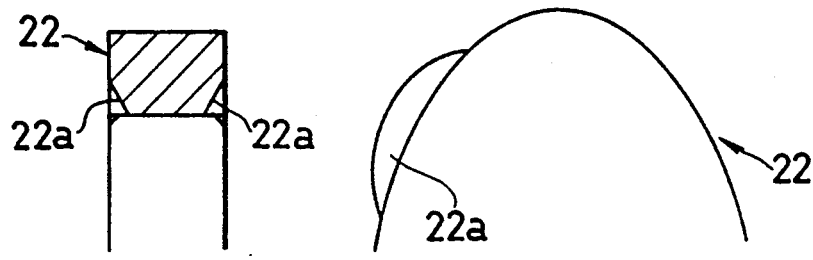
FIG. 5 is a longitudinal section of an essential part of a cam ring.
FIG. 6 is a front view of an essential part of the cam ring.

Because the force with which the vanes 21 in the suction region are urged against the cam ring is low, the cam ring 22 may be formed with a chamfer 22a in the suction region, as illustrated in FIGS. 5 and 6, thus improving the suction effect. The resulting improvement in the filling efficiency enables the limit of the number of revolutions where a cavitation is caused to be extended to a higher number of revolutions. Alternatively, instead of providing the chamfer 22a, an opening may be formed in the external surface of the cam ring 22 toward the cam surface.

Figure 7:
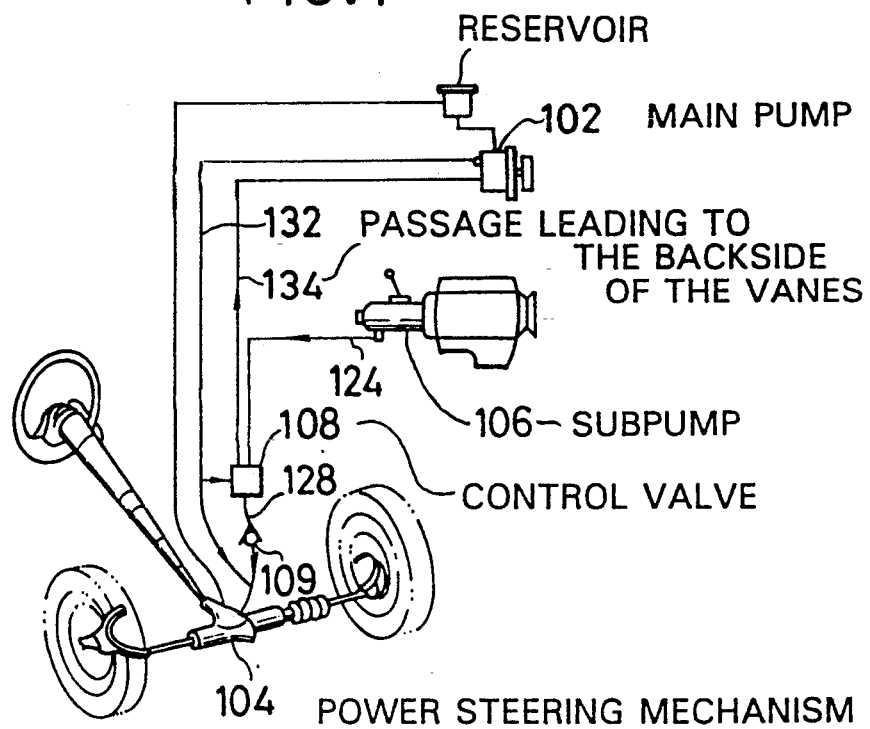
FIG. 7 is a schematic illustration of a power steering system according to a second embodiment of the invention.

FIG. 7 is a schematic illustration of a power steering system according to a second embodiment of the invention. A vane pump or main pump 102 delivers an operating oil to a power steering mechanism 104 and a subpump 106 operates as a combined vehicle speed sensor-pump which rotates at a speed proportional to a vehicle speed. Both of the pumps 102 and 106 are connected to the power steering mechanism 104 through a control valve 108 and a check valve 109. In consideration of the axle of the pump 106 which reverses its direction of rotation in accordance with the forward and the backward movement of a vehicle, the vehicle speed pump 106 is provided with a pair of check valves 110 and 112 which act in opposite directions to each other (see FIG. 8).

Figure 9:
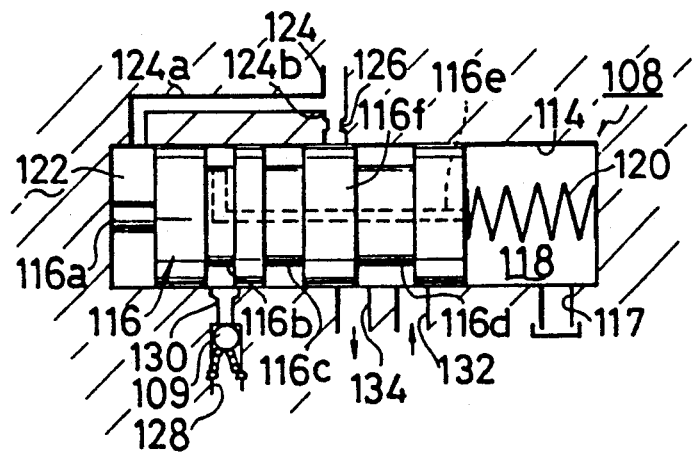
FIG. 9 is a longitudinal section of a control valve.

Referring to FIG. 9, a third embodiment of the control valve 108 is shown and includes a spool 116 which is slidably disposed within a valve opening 114. A liquid chamber 118 is located on one side of the spool 116 while another liquid chamber 122 is located on the opposite side of the spool 116, the spool being urged by a spring 120 disposed within the liquid chamber 118 toward the other liquid chamber 122 until a stop 116a bears against the end face of the valve opening 114 on this side. The spool 116 is peripherally formed with three annular grooves 116b, 116c and 116d, which are referred to as a first, a second and a third groove, as viewed from the left side of this Figure. A passage 116e provides a communication between the first annular groove 116b and the spring chamber 118, and a drain passage 117 communicates with the chamber 118.

Passages leading to the main vane pump 102, the vehicle speed sensor-pump 106 and the power steering mechanism 104 open into the valve opening 114. Specifically, a discharge passage 124 from the vehicle speed sensor-pump branches into a pair of branch paths 124a and 124b, with the path 124a opening into the liquid chamber 122 located toward the stop 116a while the other path 124b opens into the valve opening at a position where it is blocked by a land 116f defined between the second and the third annular grooves 116c and 116d when the spool 116 is inoperative. An orifice 126 is defined in the opening of the path 124b of the discharge passage 124. A passage 128 leading to the power steering mechanism 104 opens into the first annular groove 116b at a location toward the second annular groove 116c, with an orifice 130 and the check valve 109 disposed in its opening. The purpose of the check valve 109 is to prevent a back flow from the power steering mechanism 104 to a tank through the passage 128, the first annular groove 116b, the passage 116e and the chamber 118. A passage 132 into which the discharge oil from the main vane pump 102 is introduced and a passage 134 which delivers a pressure oil to the back side of the vanes open into the third annular groove 116d at locations toward the spring chamber 118 and toward the second annular groove 116c, respectively.

Figure 8:
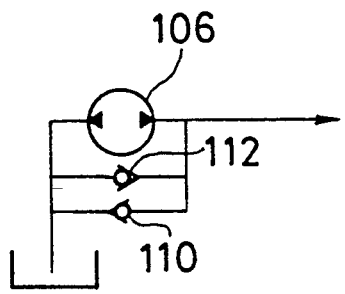
FIG. 8 is a circuit diagram of a vehicle speed sensor-pump.

The operation of the power steering system described in connection with FIGS. 7 to 9 will now be described. The spool 116 remains inoperative (see FIG. 9) when at rest, when running at very low speeds and during a backward movement, and the discharged oil from the main vane pump 102 is delivered to the back side of the vanes through the passage 132, the third annular groove 116d and the passage 134. Thus, the main vane pump 102 operates in the similar manner as in a conventional arrangement to deliver the pressure oil to the power steering mechanism 104.

Figure 10:
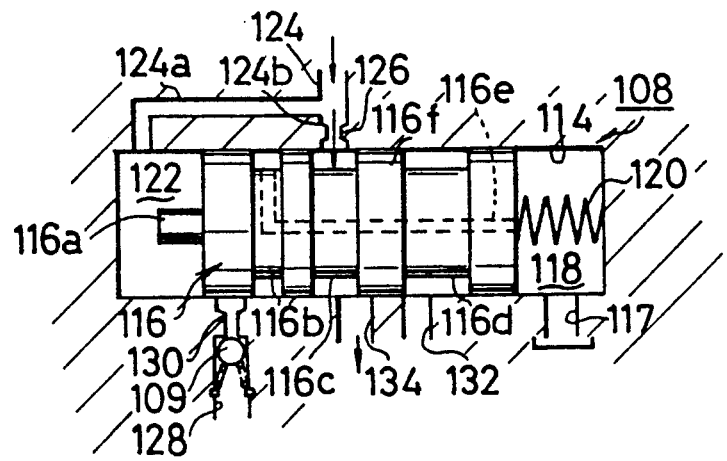
FIG. 10 is a schematic illustration of operation of the control valve.

When operating at low to medium speeds, the pressure in the liquid chamber 122 located toward the stop 116a rises to drive the spool 116 to a position shown in FIG. 10. At this position, the branch path 124b of the discharge passage 124 from the vehicle speed sensor-pump 106 which has been kept blocked by the land 116f now opens into the second annular groove 116c while the passage 134 leading to the backside of the vanes is disconnected by the land 116f from the discharge passage 132 from the main vane pump 102, and is connected to the branch path 124b from the vehicle speed sensor-pump 106 through the second annular groove 116c. Accordingly, oil from the vehicle speed sensor-pump 106 is delivered to the backside of the vanes to operate the main vane pump 102.

Figure 11:
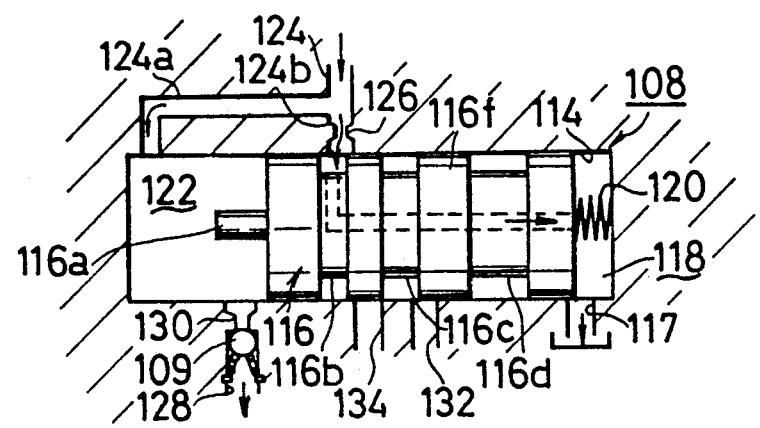
FIG. 11 is a similar view illustrating another phase of operation of the control valve.

As the vehicle speed further increases, a pressure rise occurring in the liquid chamber 122 drives the spool 116 further to the right (see FIG. 11). At this time, the passage 128 leading to the power steering mechanism 104 opens into the liquid chamber 122 and is connected to one of the branch paths, 124a, of the discharge passage 124 from the vehicle speed sensor-pump 106. The other branch path 124b is disconnected from the second annular groove 116c, and opens into the first annular groove 116b. The passage 134 leading to the back side of the vanes opens into the second annular groove 116c, and is disconnected from the discharge passage 124 from the vehicle speed sensor-pump 106. As a consequence, no pressure oil is delivered to the back side of the vanes, which therefore fail to be expelled radially outward, ceasing the function of the main vane pump 102. Oil from the vehicle speed sensor-pump 106 is delivered to the power steering mechanism 104. Any excess flow is returned through the first annular groove 116b, the internal passage 116e within the spool 116, the spring chamber 118 and the drain passage 117.

In the power steering system of the second embodiment, the main vane pump 102 ceases to function during the high speed operation while the subpump (vehicle speed sensor-pump) 106 of a reduced capacity alone is allowed to operate the power steering mechanism 104, thus attaining a reduction in a driving torque. Since the pressure acting upon the rear surface of the vanes is maintained by the discharge oil from the vehicle speed sensor-pump 106, the extent of abrasion which results from the sliding movement between the cam and the vanes can be reduced while simultaneously allowing the driving torque to be reduced as a result of a reduction in the frictional torque. It is to be noted that the vehicle speed sensor-pump 106 may be any one of trochoidal pump, an inscribed gear pump or an circumscribed gear pump or the like.

While the invention has been shown and described above in terms of several embodiments thereof, it should be understood that a number of changes, modifications and substitutions therein will readily occur to one skilled in the art from the above disclosure without departing from the spirit and scope of the invention, which is solely defined by the appended claims.

What is claimed is:

1. A power steering system comprising:
    a power steering mechanism;
    a vane pump and drive means therefor for delivering a discharged oil to the power steering mechanism, the vane pump including a rotating rotor having a plurality of moving vanes and a passageway leading to a rear surface of the vanes;
    a subpump having a driven member driven for rotation by the drive means; and
    a control valve having a movable valve member which is movable whenever a number of revolutions of the subpump reaches a preset value, the control valve having an inlet port connected in fluid circuit with a fluid discharge outlet on the subpump, the control valve having an outlet port connected in fluid circuit with the passageway leading to the rear surface of the vanes of the vane pump, discharged oil from either the vane pump or the subpump being delivered to the passageway to act upon the rear surface of the vanes of the vane pump in response to the driven member of the subpump being rotatingly driven below the preset value, discharged oil from the fluid discharge outlet of the subpump being diverted by the passageway leading to the rear surface of the vanes in the vane pump and to the power steering mechanism in response to the driven member of the subpump being rotatingly driven above the preset value.

2. A power steering system comprising:
a power steering mechanism;
a vane pump for delivering a discharged oil to the power steering mechanism, the vane pump including a rotating rotor having a plurality of moving vanes and a passageway leading to a rear surface of the vanes;
a subpump having a driven member driven for rotation by the drive means; and
a control valve having a movable valve member which is movable whenever a number of revolutions of the subpump reaches a preset value, the control valve having an inlet port connected in fluid circuit with a fluid discharge outlet on the subpump, the control valve having an outlet port connected in fluid circuit with the passageway leading to the rear surface of the vanes of the vane pump, discharged oil from the fluid discharge outlet of the subpump being delivered to the passageway to act upon the rear surface of the vanes of the vane pump in response to the driven member of the subpump being rotatingly driven below the preset value, discharged oil from the fluid discharge outlet of the subpump being diverted from the passageway leading to the rear surface of the vanes in the vane pump and to the power steering mechanism in response to the driven member of the subpump being rotatingly driven above the preset value.

3. The power steering system according to claim 2 in which the vane pump includes a pump body, and in which the subpump is housed in the pump body.

4. The power steering system according to claim 2 in which the subpump comprises a trochoidal pump.

5. The power steering system according to claim 2 in which the vane pump includes a pump body, and in which the control valve is received in the pump body.

6. The power steering system according to claim 2 in which the vane pump includes a pump body, and in which the movable valve member includes a spool which is slidably fitted in a valve opening in the pump body, the valve opening being connected in fluid circuit with the inlet port into which the discharged oil from the subpump is introduced, a first delivery outlet port connected in fluid circuit with the power steering mechanism, a communication passageway between the inlet port and the outlet port while the first delivery outlet port to the power steering mechanism is interrupted when the subpump is operating at low speeds, said communication passageway being interrupted and said inlet port connected in fluid circuit with the first delivery outlet port to the power steering mechanism when said subpump is operating at higher speeds.

7. A power steering system for a power steering comprising:
a vane pump and drive means therefor for delivering a discharged oil to the power steering mechanism, the vane pump including a rotating rotor having a plurality of moving vanes and a passageway leading to a rear surface of the vanes;
a subpump having a number of revolutions which varies in proportion to a vehicle speed; and
a control valve having a movable valve member which is movable in accordance with the number of revolutions of the subpump, the control valve having an inlet port connected in fluid circuit with a fluid discharge outlet on the subpump, the control valve having an outlet port connected in fluid circuit with the passageway leading to the rear surface of the vanes of the vane pump, discharged oil from the vane pump being delivered to the passageway and the power steering mechanism and is also delivered to the outlet port to act upon the rear surface of the vanes of the vane pump when the subpump operates at a low number of revolutions, the delivery of the discharged oil from the vane pump to the outlet port to act upon the rear surface of the vanes of the vane pump being interrupted while the discharged oil from the subpump is connected in fluid circuit with the outlet port to act upon the rear surface of the vanes when the subpump is operating at a medium number of revolutions, and the delivery of the discharged oil from the subpump to the outlet port to act upon the rear surface of the vanes of the vane pump being interrupted and is instead delivered to the power steering mechanism when the subpump is operating at a higher number of revolutions.

8. The power steering system according to claim 7 in which the vane pump includes a pump body, and in which the movable valve member includes a spool slidably fitted in a valve opening in the pump body, the valve opening being connected in fluid circuit with the inlet port into which the discharged oil from the vane pump is introduced, a first delivery outlet port connected in fluid circuit with the power steering mechanism, a communication passageway between the inlet port and the first delivery outlet port to the power steering mechanism being interrupted by the spool while a further communication passageway is established between the inlet port from the vane pump and the outlet port leading to the rear surface of the vanes when the subpump is operating at low speeds, the further communication passageway between the inlet port from the vane pump and the outlet port being interrupted while a still further communication passageway is established between the inlet port from the subpump and the outlet port leading to the rear surface of the vanes when the subpump is operating at medium speeds, and a yet still further communication passageway being established between the inlet port from the subpump and the first delivery outlet port to the power steering mechanism while the other communication passageways are disconnected when the subpump is operating at a higher number of revolutions.

9. The power steering system according to claim 1, further including a check valve disposed in the first delivery outlet port leading to the power steering mechanism.

10. The power steering system according to claim 1 in which a cam ring of the vane pump is provided with a chamfer in its suction region.

* * * * *

UNITED STATES PATENT AND TRADEMARK OFFICE
CERTIFICATE OF CORRECTION

PATENT NO. : 5,289,681

DATED : March 1, 1994

INVENTOR(S) : Hiroto IWATA

It is certified that error appears in the above-identified patent and that said Letters Patent is hereby corrected as shown below:

Column 7, line 10; change "by" to ---from---.

Signed and Sealed this

Sixteenth Day of August, 1994

Attest:

BRUCE LEHMAN

Attesting Officer   Commissioner of Patents and Trademarks